United States Patent [19]
Wickham et al.

[11] 3,799,623
[45] Mar. 26, 1974

[54] CONTROLLING RAILWAY VEHICLE BRAKES

[75] Inventors: David John Wickham; John Dale Coleman, both of London, England

[73] Assignee: Westinghouse Brake and Signal Company, Limited, London, England

[22] Filed: Oct. 8, 1971

[21] Appl. No.: 187,779

[30] Foreign Application Priority Data
Oct. 26, 1970  Great Britain.................... 50799/70

[52] U.S. Cl............................ 303/20, 303/3, 303/15
[51] Int. Cl.............................................. B60t 13/68
[58] Field of Search......... 303/3, 15, 20, 7; 188/3 R

[56] References Cited
UNITED STATES PATENTS
| | | | |
|---|---|---|---|
| 2,147,297 | 2/1939 | Farmer et al. | 303/20 X |
| 3,432,210 | 3/1969 | Crouch | 303/20 X |
| 3,606,484 | 9/1971 | Dressler, Jr. | 303/20 |
| 3,507,542 | 4/1970 | Cannella | 303/3 X |

Primary Examiner—George E. A. Halvosa
Assistant Examiner—Stephen G. Kunin
Attorney, Agent, or Firm—Larson, Taylor & Hinds

[57] ABSTRACT

Railway vehicle brake control arrangement for a power car or locomotive which in operation is one of at least two similar cars or locomotives in a train of vehicles having a continuous brake pipe the pressure in which is controlled by the combined action of apparatus in each power car or locomotive in response to a signal supplied by one of the power cars or locomotives which controls both over an electrical feed-path extending between them through the train. The pressure in the brake pipe controls brake applying apparatus on all vehicles in the train. The brake pipe is charged only at one of the cars or locomotives but vented at both by the action of the apparatus thereon. The apparatus also maintains a small pressure gradient in the brake pipe rising from the charging point to restrain anomalous braking due to charging surges or pressure waves. Overcharge, emergency braking, trackside control and one on two-pipe operation may be included in the arrangement.

18 Claims, 3 Drawing Figures

3,799,623

CONTROLLING RAILWAY VEHICLE BRAKES

This invention relates to the control of railway vehicle brakes and in particular to the electrical control of pneumatic brakes.

According to the invention there is provided a railway vehicle brake control arrangement including control means operable to selectively electrically energise an electrical feed path in accordance with a desired degree of braking, means responsive to said selected energisation of the feed path to derive from a first fluid pressure source a control pressure representative of said selected energisation, fluid pressure control means connected to a brake pipe of said brake arrangement and responsive to said control pressure to control the pressure maintained in said brake pipe by a second fluid pressure source to a pressure corresponding to said desired degree of braking, and brake applying means responsive to the pressure in the brake pipe to exert a brake effort of said desired degree.

The arrangement may include means to interrupt the supply of electrical energy to said control means, and means responsive to the interruption or supply of energy to respectively prevent or permit the supply of fluid pressure from the second source to the brake pipe. The fluid pressure supply from the second source to the brake pipe may be through a choke whereby the rate of rise of fluid pressure in the brake pipe is restricted. When the feed path is energised to represent the "brakes released and running" condition the control pressure derived from the first fluid pressure source may have a value set not by the means responsive to the selective energisation of the feed path but by a separate pressure control means.

The fluid pressure control may include a group of coupled pressure responsive members to which fluid pressure is selectively applied or from which fluid is selectively vented by individual valves electrically energised or de-energised either in accordance with the energisation state of said feed-path or the operative or non-operative condition of said control means, the selected force exerted by said group of pressure responsive members either individually or in combination, in conjunction with said control pressure determining the maintained brake-pipe pressure.

The means responsive to the selective energisation of the feed path to derive the control pressure may include a group of coupled pressure responsive members to which fluid pressure is selectively applied or from which fluid is selectively vented by valves electrically energised or de-energised in accordance with the energisation state of said feed path, the individual forces exerted by said coupled members either individually or in combination determining the control pressure derived from the first fluid pressure source. The group of coupled pressure responsive members may be connected to a self-lapping valve the input to which is fluid pressure from the first fluid pressure source and the output of which is said control pressure.

The feed-path may include a plurality of conductors each representing one digit of a binary signal together with a return conductor. The arrangement may include a relay having individual coils for all but one of the plurality of conductors, the coils each controlling a contact in a series path from the one conductor whereby the series path is only energised when all the plurality of conductors in energised. The series path may be arranged to control the energisation of a magnet valve which applies a fluid pressure to a further pressure responsive member coupled to said group of pressure responsive members only when the path is energised.

Each pressure responsive member of the coupled group may correspond to a digit of the binary signal on the feed-path and the force exerted by an individual pressure responsive member may be proportional to the significance of the respective digit. The same fluid pressure magnitude may be applied to each pressure responsive member, this fluid pressure magnitude being derived from said first source through a common pressure control means. The pressure applied to said further pressure responsive member may be effective to derive from said first pressure source a control pressure to maintain in the brake pipe a pressure corresponding to the full service application pressure. The control pressure derived by said group of pressure responsive members when supplied with pressure either individually or in combination may derive from said first pressure source a range of control pressures corresponding to the application range of the brake arrangement.

An additional pressure responsive member coupled to said group and said further pressure responsive members may have fluid pressure from said first source supplied to it only in the "brakes released and running" condition to derive, in conjunction with the group and the further pressure responsive members, a control pressure for this brake setting.

Further means responsive to the interruption of supply of energy to the control means may be arranged to respectively permit or prevent the supply of fluid pressure from said first source to another additional pressure responsive member connected to said group of pressure responsive members. Additional means responsive to the interruption or supply of energy to said control means may be provided to respectively permit the supply of pressure direct from said first fluid pressure source as a control pressure in the release and running position or permit the supply of a reduced controlled pressure in the brakes released and running condition. The desired degree of braking may be modified in transmission to the feed-path by means responsive to a signal representing a limiting value of a brake application in a specific circumstance. The feed-path is then energised at the modified selected energisation.

According to another aspect of the invention there is provided brake apparatus for a train of vehicles equipped with a continuous fluid pressure brake pipe and an electrical feed-path including on one vehicle means operable to generate an electrical signal representing a desired degree of braking and apply said signal to said feed-path, means on said one vehicle and at least another vehicle, not adjacent thereto in said train responsive to said signal or said feed-path to modify the pressure in said brake pipe in accordance with said desired degree of braking, whereby brake applying means on each vehicle of the train are operated.

Embodiments of the invention will now be described with reference to the accompanying drawings in which.

Figure 1:
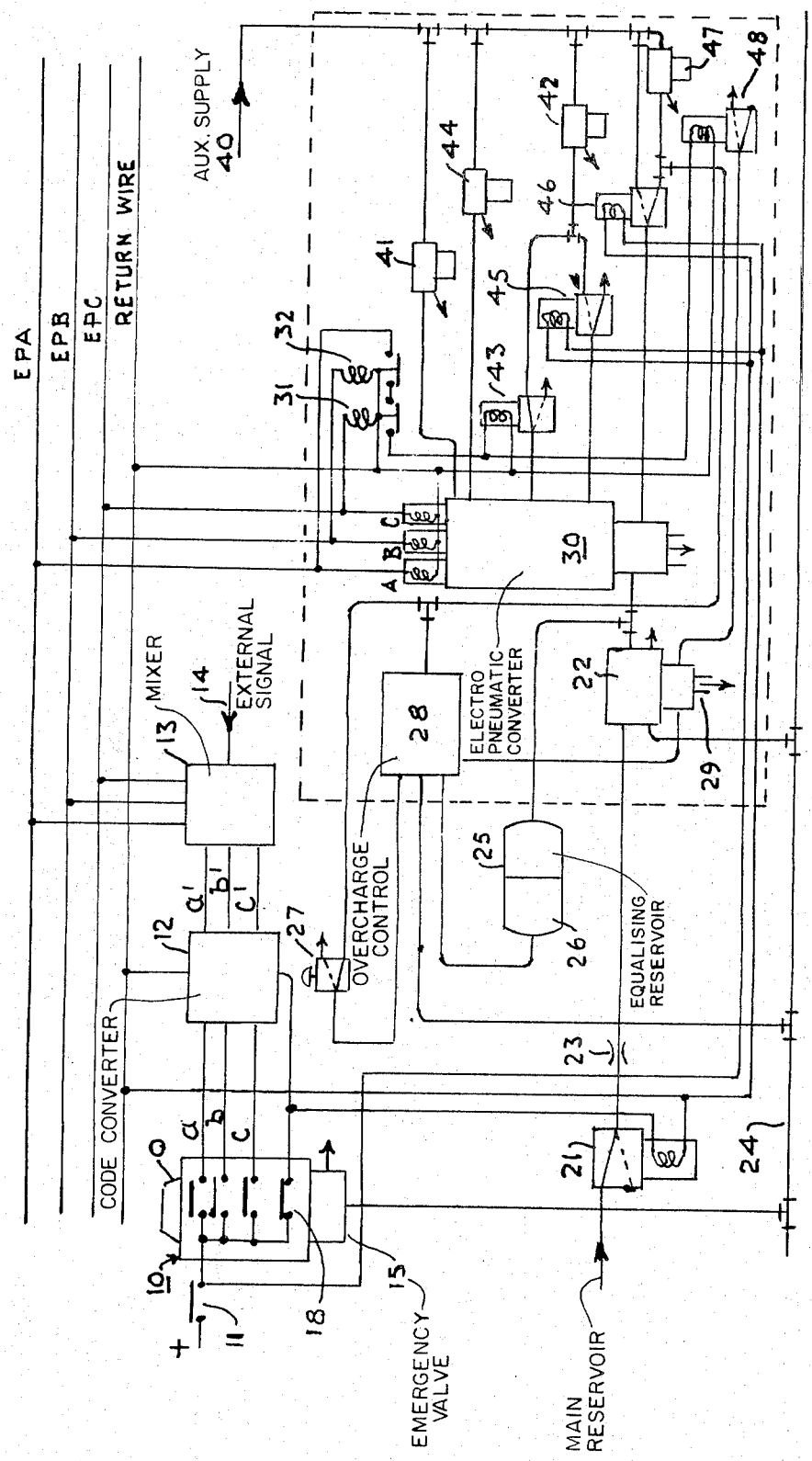
FIG. 1 is a block schematic diagram of a railway vehicle brake control arrangement.

Referring to FIG. 1 this shows the apparatus which will be provided on a power car or a locomotive which in operation would be one of at least two similar locomotives or cars in a train of vehicles having a continuous brake pipe the pressure in which is controlled by the combined action of the apparatus shown in each power car or locomotive in response to a signal supplied by one of the power cars or locomotives.

In a preferred arrangement the train of vehicles consists of a power car at each end of a train of coaching stock. An electrical feed-path is provided which extends the length of the train of vehicles to provide a signal path between the power cars while merely passing through the coaching stock. A brake pipe is provided throughout the train to which fluid pressure connections are made both at each power car and at each vehicle of the coaching stock. One power car is designated as the control car for the train and switches in each car operated accordingly. The driver of the train can operate a brake controller in the control car to the level of braking he desires and this level, modified if required by control signal derived in known manner from the track or track-side, is applied to the electrical feed-path for transmission to the brake pipe pressure control apparatus in the control car and the other power car (or cars). Each power car brake pipe pressure control apparatus will adjust the brake pipe pressure in accordance with the signal from the electrical feed-path and brake-applying apparatus responsive to brake pipe pressure will operate brakes on each vehicle in accordance with this pressure.

FIG. 1 shows at reference 10 a brake controller for selectively energising one or more of three conductors a, b, c of an electrical feed-path from an electrical supply (not shown) in accordance with the setting of the controller. The controller 10 is connected to this supply through a master switch 11 the operation of which in each power car must be controlled to ensure that only one controller, in the control car, is energised at a time. The master switches may be electrically interlocked if required. The energisation state of conductors a, b and c is applied to a code converter 12 to convert from that binary code (Gray) most suitable for use with the controller 10 to that binary code (normal) most suitable for further transmission along the feed-path of the train. The converted code is conveyed along the conductors A', B', C' to a mixer unit 13 in which a signal 14, which may be derived from track side equipment, indicating that degree of braking which may be applied at that particular point in the train's journey is combined with the signal on conductors A', B', C' indicating the degree of braking desired by the driver to produce a signal applied to conductors EPA, EPB, EPC of the feed-path along the train which represents the actual degree of braking to be exerted. A fourth conductor, the return wire, completes the electrical feed-path along the train. The main reservoir in each power car is connected to the brake pipe pressure control apparatus through a magnet valve 21 which is arranged, when energised by the closure of master switch 11, to put the main reservoir into connection with a relay valve 22. When de-energised for any reason the magnet valve isolates the main reservoir from the relay valve and also closes off the connection between the magnet valve and the relay valve. The relay valve 22 is operated in a manner to be explained later to control the pressure in the brake pipe 24 in accordance with the signal on the electrical feed-path along the train. A choke 23 is provided in the connection between the magnet valve 21 and the relay valve 22 to limit the supply of fluid from the main reservoir to the brake pipe to permit the operation of the normal emergency brake application in the event of a vehicle breakaway or an emergency application by a passenger or the guard. The master controller 10 is also arranged to permit an emergency application to be made by the incorporation of a mechanically operated valve 15 which vents the brake pipe when the controller is set to the emergency position. At this controller setting contact 18 is opened to prevent supply of fluid pressure to the brake pipe through magnet valve 21.

Reference is now directed to that portion of the drawing enclosed by the dotted line. Herein the electrical signal on the feed-path is converted to a pneumatic signal for application to the relay valve 22 to control the pressure in the brake pipe. An electro-pneumatic converter valve generally indicated at reference 30 is arranged to apply fluid pressure from an auxiliary stabilised fluid pressure supply 40 to the relay valve 22 by the operation of electro-magnetic devices A, B, C energised respectively by conductors EPA, EPB, EPC. A preferred form of converter 30 has a stack of diaphragms, graduated in size to correspond to the binary significance of the conductors EPA, EPB, EPC, to which fluid pressure is appropriately admitted by the action of the devices A, B, C. The cumulative effect of the pressure on the stack of diaphragms acts through a self-lapping valve to control a fluid pressure in accordance with the degree of braking required by the signal on the feed-path and this pressure is applied to the relay valve 22. The operation of the device A, B, C will produce a step-wise increment or decrement of the pressure applied to the relay valve 22. It is desirable that these step-wise changes take place over an intermediate part of the range of brake pipe pressures controllable by the relay valve 22. Accordingly additional diaphragms are provided on the diaphragm stack in converter 30 to respectively set the starting point of the step-wise change and to supplement the step-wise change to the normal extreme pressure of the brake pipe. In the illustrated arrangement the normal extreme brake pipe pressure is 70 p.s.i, the step-wise change takes place in six steps over a range of 16 p.s.i. between 64 p.s.i. and 48 p.s.i.

In order to produce a fail-safe system it is arranged that the electrical pressure control devices produce that pressure corresponding to the applied condition of the brakes when they are de-energised. Accordingly a pressure control means 41 supplies a pressure from the stabilised auxiliary supply 40 to the appropriate diaphragm of the converter 30 such that the pressure supplied to the relay valve 22 establishes a pressure of 48 p.s.i. in the brake pipe 24 when all of the devices A, B, C are de-energised. As the devices A, B, C are then selectively energised and de-energised the step-wise pressure change up to 64 p.s.i. will be produced in the brake pipe 24 through the action of relay valve 22. The pressure of 64 p.s.i. corresponds to the end of the step-wise change and the supplementary step of 6 p.s.i. corresponding to the energisation of all the devices A, B, C is detected by the energisation of relays 31 and 32 by wires EPB, EPC respectively to apply the energised condition of wire EPA to a magnet valve 43. Energisation of valve 43 applies a pressure derived from the auxiliary supply 40 through a pressure control means 42 to a further diaphragm of converter 30. The pressure on this further diaphragm overcomes the self-lapping action of the valve of converter 30 and the pressure set by pressure control means 47 is applied directly to relay valve 22. In this way the brake pipe pressure limiting valve sets the pressure in the equalising reservoir 25. The relay valve 22 does not limit the brake pipe pressure at this setting of the converter and the brake pipe pressure will rise towards the main reservoir pressure of some 80 p.s.i. supplied through valve 21. A choke (not shown) is in the connection to the equalising reservoir to control the rate of fall of reservoir pressure to determine the normal service rate of drop of brake pipe pressure. A check valve (not shown) is arranged to by-pass this choke during release to avoid delaying reservoir recharge.

On a non-controlling power car magnet valve 46 is de-energised and pressure control means 47 is by-passed. The pressure applied to the self-lapping valve of converter 30 thus tends to that of source 40 (c.100 p.s.i.) and the relay valve 22 of a non-controlling car will attempt to set a higher brake pipe pressure than that in an operative car. This reduces the risk of a "blow through" from the operative to a non-controlling car, which leads to continuous brake pipe venting. (See also below).

Pressure control means 44 determines the size of each of the step-wise changes by supplying pressure from the stabilised auxiliary pressure supply 40 to the converter 30 through devices A, B, C.

If one of devices A, B, C, although energised, should fail to operate a partial brake application will be retained, the pressure in the brake pipe not reaching 70 p.s.i., the fully released level.

As so far described the arrangement thus provides for the control of a pressure in a brake pipe to give service brake application and release by electro-pneumatic methods at each power car connected to the train feed-path and for emergency braking by mechanical-pneumatic methods at the operative controller and at passenger and guard controlled points. It should be noted that the pressure in the pipe 24 can only be raised through the relay valve 22 in the operative power car as the fluid pressure supply from the main reservoir is isolated by the operation of magnet valve 21. Accordingly, in the non-controlling power car or cars, the converter 30 can only act on the relay valve 22 to reduce the pressure in the brake pipe 24. This arrangement to charge at one point, while venting at two for applications, reduces the possibility of pressure surges in the brake pipe giving rise to anomalous braking through to the unco-ordinated changing of the brake pipe at several paints to a common nominal pressure which will in practice have different values at each point.

Another feature which reduces the possibility of such anomalous braking is a provision of a further diaphragm in each converter 30 to which pressure may be applied through magnet valve 45. Magnet valve 45 is arranged so that when de-energised by the operation of the master switch 11 in a non-operative power car it applies a fluid pressure to the further diaphragm in the converter 30 to bias the diaphragm stack so that the relay valve 22 is supplied with a pressure which is a fixed amount higher than that applied in the operative car for the same energisation condition of the feed path. In the illustrated arrangement this pressure is derived from the pressure control means 42 and is preferably approximately one step (2–7 p.s.i.) This arrangement ensures that the brake pipe pressure at the operative power car, at which pressure is supplied to the brake pipe, is always lower than the aiming pressure at the non-controlling car or cars so that a relay valve operating correctly within the normal tolerances at a pressure slightly lower than that in the operative car cannot provide a vent from the brake pipe. When the master switch is closed the magnet valve 45 operates to vent the further diaphragm in the converter 30 which therefore has no effect on the diaphragm stack. A further magnet valve 46 is connected electrically in parallel with magent valve 45 so that in a non-controlling power car the pressure supplied to the self-lapping valve controlled by the diaphragm stack in the converter 30 is derived directly from the stabilised auxiliary supply 40 while in the energised position, corresponding to an operative power car, a pressure applied to the self-lapping valve is derived from the stabilised supply through a limiting valve 47 set to a value of 70 p.s.i. The reason for this arrangement is as follows. In non-controlling power cars the relay valve 22 must be capable of setting the brake pipe pressure to a value above 70 p.s.i. in response to such an output from the self-lapping valve of converter 30, caused for example by the action of magnet valve 45. Accordingly stabilised auxiliary supply 40 has a nominal value of 100 p.s.i.

An equalising reservoir 25 is provided for the output of the electro-pneumatic converter 30 applied to the relay valve 22.

The arrangement illustrated also provides for an overcharge operation to ensure that all the brakes of the vehicles in the train are released. An overcharge can be selected at any time in the operative power car but the selection will be stored in unit 28 and only come into effect when the feed-path is energised to fully release the brakes. The only source of overcharge pressure is the operative power car through its relay valve 22 and by making further use of the double relay 31, 32 by connecting a magnet valve 48 in parallel with magnet valve 43 magnet valve 48 is only operated when all conductors in the feed-path are energised. In its unoperated condition magnet valve 48 vents an overcharge diaphragm chamber in relay valve 22, when operated magnet valve 48 closes off the venting of this chamber. An overcharge is initiated by the driver operating valve 27 to apply a pressure derived from the stabilised auxiliary supply 40 through a pressure control device 47 (previously described) to a normally vented control port of the overcharge controller 28. The overcharge controller is, in a preferred arrangement, substantially as described in United Kingdom Pat. No. 1,291,230. This patent describes a controller which in response to a signal such as provided by valve 27 will produce an overcharge in a brake pipe of predetermined time and magnitude by the application of pressure to an auxiliary diaphragm such as that of relay valve 22. The overcharge controller described in the above-mentioned patent is also responsive to a brake application occurring during the controlled overcharge to restart the cycle after the brake application is released to ensure that a predetermined magnitude and duration of overcharge are properly executed. A reservoir 26 is associated with the overcharge controller 28. The action of the overcharge controller is to apply a pressure to the overcharge diaphragm of relay valve 22 to raise the brake pipe pressure to some 76 p.s.i. The controller then allows pressure on the overcharge diaphragm to vent slowly through a choke 29 which controls the rate at which the brake pipe pressure returns to the normal value of 70 p.s.i. The vent from the overcharge diaphragm chamber provided by magnet valve 48 is such as to rapidly vent the chamber in the event of a brake application during overcharge.

When the above brake arrangement is used for the power car or locomotives of a train of vehicles incorporating at least two power cars or locomotives, the remainder being air-braked coaching stock, a pressure change in the brake pipe corresponding to a brake application will be initiated simultaneously in each power car in response to the signals in the feed-path. However air can only be supplied to the brake pipe through the control car and therefore pressure changes corresponding to brake release or overcharge will only be initiated from one power car.

The manner in which the brakes are applied in response to a change in brake pipe pressure forms no part of this invention, any well-known system may be used. For example, a two-pipe system of a distributor applying a fluid pressure from a train pipe to a brake actuator in accordance with the brake pipe pressure. Automatic Warning or other safety systems may be incorporated in known manner.

The feed-path for electrical brake signals extends throughout the train, linking all the power cars, so brake control can be exercised from any point in the train provided with a connection for the controller when the master switches in each power car are appropriately set. The arrangement is therefore particularly suitable for push-pull train working.

Figure 2:
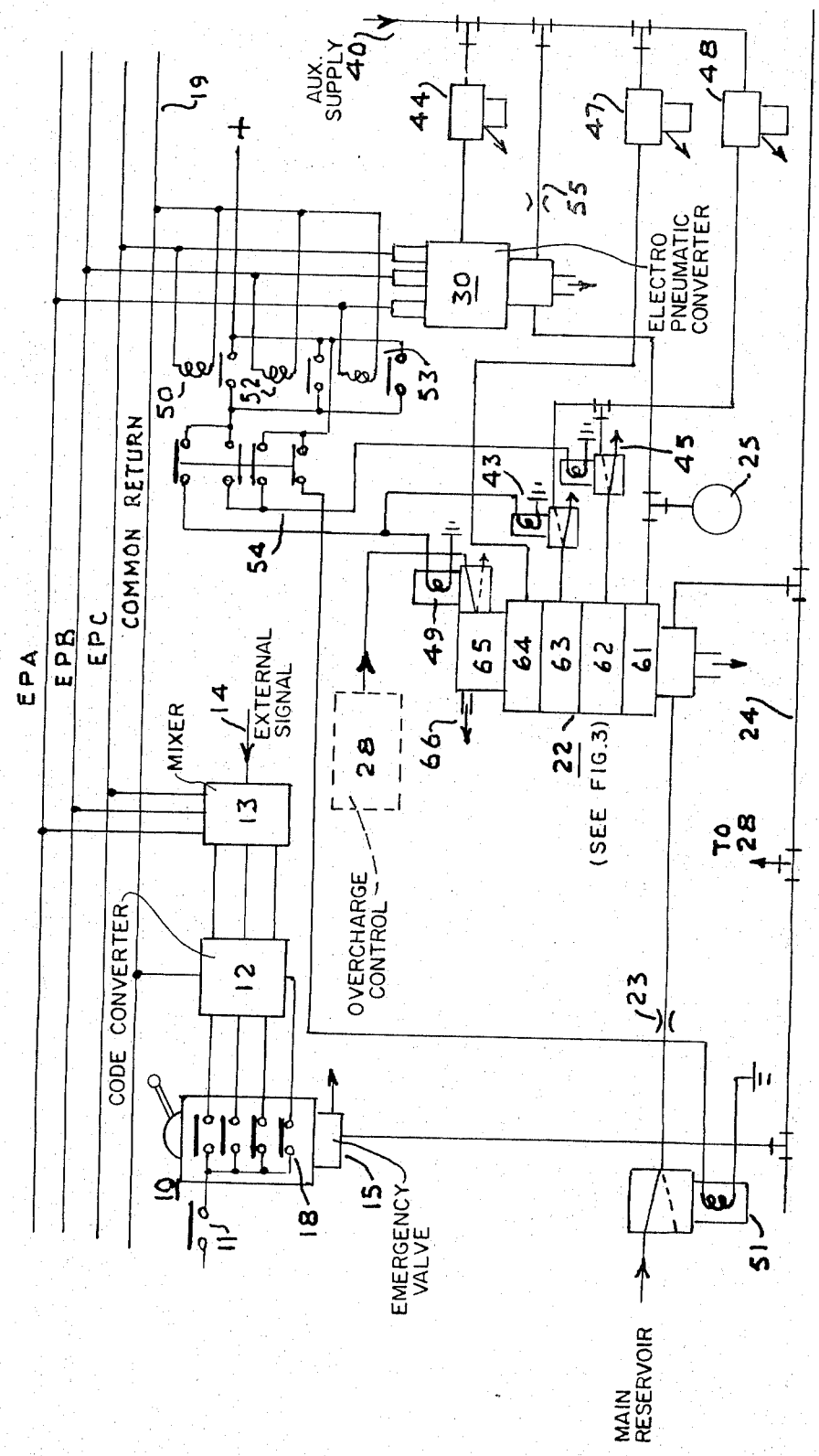
FIG. 2 is a block schematic diagram of a railway vehicle brake control arrangement.

FIG. 2 shows an alternative brake arrangement. Reference numerals the same as those in FIG. 1 identify elements of the brake arrangement which have similar functions, not always identical, to those in FIG. 1. Converter 30 is selectively energised by electrical signals over the conductors EPA, EPB, EPC and the feedpath 19 from the controller 10 to produce step-wise changes in the pressure applied to the diaphragm section 61 of the relay valve 22. Relay valve 22 in this arrangement (see FIG. 3) has a stack of four connected diaphragms 61, 62, 63, 64 and a fifth diaphragm section 65 which only acts upon the stack when pressure is applied to it. The converter 30 only has the diaphragms relevant to the devices A, B, C described above and it will be seen that to a certain extent the additional diaphragms of converter 30 are replaced by the diaphragm stack in relay valve 22. This change however alters some of the details of the arrangement. The converter 30 is supplied with pressure at 70 p.s.i. by the pressure control means 44 from the auxiliary stabilised source 40 and through the selective action of devices A, B, C the self-lapping valve converter 30 applies a pressure varying in steps of 10 p.s.i. between 0 and 70 p.s.i. to the equalising reservoir 25 and the diaphragm 61 of relay valve 22. A choke 55 times the application of the pressure to the equalising reservoir and therefore the brake application. Pressure control means 47 applies a pressure of 70 p.s.i. from the source 40 to the diaphragm 64 of relay valve 22. Diaphragm 64 is so-sized in relation to the other diaphragms in relay valve 22 that in the absence of pressure applied to these other diaphragms pressure control means 47 establishes a pressure of 70 p.s.i. in brake pipe 24 through the action of the self-lapping valve 22 controlling the supply of fluid pressure through magnet valve 51 and choke 23 from the main reservoir.

The action of master switch 11 described above is partly replaced by the multi-contact switch 54. The lower two sets of contacts of switch 54 are energised from an electrical supply on the vehicle, which may be a local source, and when the lower pairs of contacts are closed, as shown in the drawings, magnet valve 51 is energised to permit the supply of fluid pressure from the main reservoir to the brake pipe and magnet valve 45 is energised to vent diaphragm 62 of relay valve 22. Switch 54 is thus shown in the position corresponding to the closed position of master switch 11 described above. A triple relay composed of coils 50, 52 and 53 and associated contact is arranged so that the uppermost two sets of contacts of switch 54 are only energised when all the conductors EPA, EPB, EPC in the feed-path are energised, that is the release and running position. In this position magnet valve 49 is energised to connect the overcharge unit 28 to the diaphragm 65. Overcharge control unit 28 is similar to that described above but an overcharge application in this arrangement will be described below. Magnet valves 43 and 45 are supplied with pressure at 70 p.s.i. through pressure control means 48 from stabilised source 40.

It will be seen that the various diaphragms of relay valve 22 will have pressure selectively applied to them in accordance with the energisation states of the wires in the feed-path 19 and the setting of the multi-contact switch 54.

Brake applications in both a control car and a non-controlling power car will now be considered. In the control car the multi-contact switch 54 is in the position shown so that the magnet valve 51 is energised to permit the supply of pressure from the main reservoir. Choke 23 has the functions as the choke described in FIG. 1. In the release and running position the contacts associated with coils 50, 52 and 53 are open, a fluid pressure of 70 p.s.i. is applied to the diaphragm 64 through control 47 and this diaphragm alone acts to control the brake pipe pressure to 70 p.s.i. On operating the controller 10 to alter the energisation state of devices A, B, and C in converter 30, 70 p.s.i. is applied to diaphragm 63 through magnet valve 43 to give the 6 p.s.i. first application step in conjunction with the first step of converter 30. Further steps of converter 30 increase the pressure on diaphragm 61 to reduce the brake pipe pressure in steps of 2.7 p.s.i. to the full service pressure of 48 p.s.i. Pressure steps applied to diaphragm 61 are of 10 p.s.i. so that the output of the converter ranges between 0 and 70 p.s.i. as the degree of brake application is increased. So long as a brake application is in force magnet valve 49 is energised to isolate the overcharge unit 28 from the overcharge diaphragm 65, which diaphragm is vented through the magnet valve. In the non-controlling car the switch 54 is in its alternative position and magnet valve 51 is always de-energised to prevent the supply of pressure to the brake pipe in this car. The lower of the upper two sets of contacts of switch 54 is closed so that when all the contacts of the triple relay are open in the release and running position magnet valve 45 applies 70 p.s.i. pressure to diaphragm 62 to produce a non-controlling car bias so that the brake pipe pressure in the noncontrolling car tends to a higher value than in the noncontrolling car (say 2.7 p.s.i. differential). This avoids the anomalous charging conditions described above with reference to FIG.1.

The overcharge magnet valve 49 permits the application of an overcharge pressure to the overcharge diaphragm 65 in the control car alone, provided the controller 10 is in the release-and-running position. The action of the overcharge is similar to that described above. However by so positioning magnet valve 49 that instead of venting the overcharge reservoir or an application being made during an overcharge cycle it traps pressure in the overcharge reservoir and holds it until the end of the application when on the return to the release-and-running position the valve again opens to apply the overcharge reservoir pressure to the diaphragm 65 to continue the overcharge cycle from the point which it was interrupted. The rate of fall of overcharge pressure is controlled by the choke 66 on the overcharge diaphragm chamber.

Figure 3:
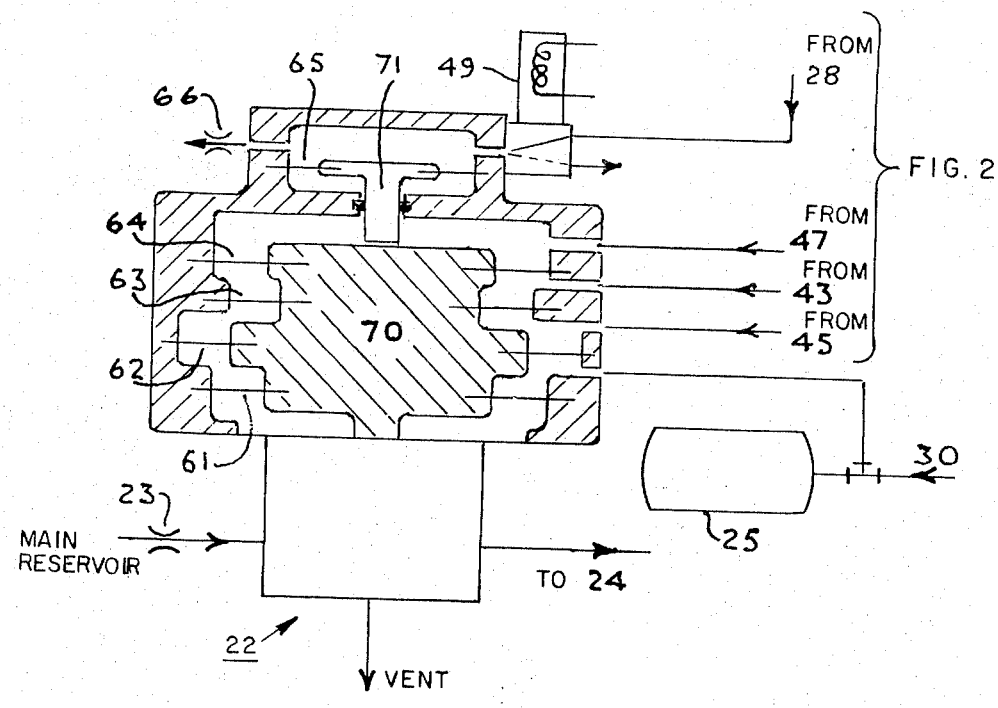
FIG. 3 is a diagrammatic sectional view of a relay valve suitable for the FIG. 2 arrangement.

FIG.3 shows a form of relay valve particularly suitable for use with the arrangement of FIG.2. It will be seen from the section in FIG.3 that four diaphragms 61, 62, 63 and 64 are connected to a member which operates the self-lapping valve the assembly forming the stack mentioned above. The diaphragms are so-sized with respect to each other that the same pressure of nominally 70 p.s.i. applied to each in combination or alone will produce the various brake pipe pressures described above. The overcharge diaphragm is connected to a member slidable in O-ring seal so that when pressure is exerted on the diaphragm 65 the member to which the other diaphragms are coupled is moved downwards to operate the self-lapping valve to an overcharge position. When no pressure exists in the overcharge diaphragm chamber the frictional load of the overcharge diaphragm arrangement is not exerted on the coupled diaphragm and does not inhibit the operation of the remainder of the relay valve.

The above descriptions relate to the brake arrangements for a multiple unit but the arrangements are equally suitable for application to a single locomotive having a control position at each end and also enable such locomotives to be multiplied and controlled from one control position.

Having thus described our invention what we claim is:

1. A railway vehicle brake arrangement including at a control position a controller operable to selectively electrically energise a signal feed path from a source of electricity in accordance with a desired degree of braking, the feed path extending from the control position to a fluid pressure brake apparatus having an electrical-to-fluid-pressure converter responsive to the selected energisation of the feed path to derive from a first fluid pressure source a control pressure representative of the selected energisation, a fluid pressure controller connected between a second fluid pressure source and a brake pipe of the brake apparatus and responsive to the control pressure to control the pressure maintained in the brake pipe by a second fluid pressure source to a pressure corresponding to said desired degree of braking, and a brake actuator to exert a brake effort in response to the pressure in the pipe, wherein said control position and said fluid pressure controller are on one vehicle of a train of vehicles along which said feedpath and said brake pipe extend, further including means on another vehicle, not adjacent to said one vehicle in said train, responsive to the selected energisation of the feedpath to modify the pressure in said brake pipe in accordance with said desired degree of braking, whereby brake actuators on each vehicle of the train are operated to exert a brake effort in response to the pressure in the pipe.

2. An arrangement as claimed in claim 1 including means to interrupt the supply of electrical energy to said controller, and means responsive to said interruption of supply of energy to prevent the supply of fluid pressure from said second source to said brake pipe.

3. An arrangement as claimed in claim 2 in which fluid pressure from said second source is supplied to said brake pipe through a choke whereby the rate of rise of fluid pressure in the brake pipe is restricted.

4. An arrangement as claimed in claim 2 including additional means responsive to the interruption or supply of energy to said controller to respectively permit the supply of pressure direct from said first fluid pressure source of the control pressure in the "brakes released and running" condition or to permit the supply of a reduced controlled pressure in the "brakes released and running" condition.

5. An arrangement as claimed in claim 1 in which said fluid pressure controller connected to said brake pipe includes a group of coupled pressure responsive members to which fluid pressure is selectively applied or from which fluid is selectively vented by individual valves selectively energised or deenergised either in accordance with the energisation state of said feedpath or the operative or non-operative condition of said controller means, the selected force exerted by said group of pressure responsive members either individually or in combination, in conjunction with said control pressure, determining the maintained brake-pipe pressure.

6. An arrangement as claimed in claim 1 in which the converter responsive to the selected energisation of the feedpath that derives the control pressure includes a group of coupled pressure responsive members to which fluid pressure is selectively applied or from which fluid pressure is selectively vented by valves electrically energised or de-energised in accordance with the energisation state of said feedpath, the individual forces exerted by said coupled members either individually or in combination determining the control pressure derived from the first fluid pressure source.

7. An arrangement as claimed in claim 6 in which the coupled pressure responsive members are connected to a self-lapping valve the input to which is a fluid pressure from the first fluid pressure source and the output of which is said control pressure.

8. An arrangement as claimed in claim 6 in which the feedpath includes a plurality of conductors each representing one digit of a binary signal together with a return conductor, and in which each pressure responsive member corresponds to a digit of the binary signal on the feed path and in which the force exerted by each individual pressure responsive member is proportional to the significance of the respective digit.

9. An arrangement as claimed in claim 8 in which the fluid pressure applied to each pressure responsive member has the same magnitude, the fluid pressure of this magnitude being derived from said first source through a common pressure control means.

10. An arrangement as claimed in claim 8 including a relay having individual coils for all but one of the plurality of conductors, the coils each controlling a contact in a series path from the one conductor whereby the series path is only energised when all the plurality of conductors is energised.

11. An arrangement as claimed in claim 10 in which a magnet valve is energised over said series path to apply a fluid pressure to a further pressure responsive member coupled to said group of pressure responsive members only when said path is energised.

12. An arrangement as claimed in claim 11 in which the pressure applied to said further pressure responsive member exerts a force to derive a pressure from said first source which via said fluid pressure controller means maintains a brake pipe pressure corresponding to the full service application pressure.

13. An arrangement as claimed in claim 6 in which the control pressure derived by said group of pressure responsive members when supplied with pressure either individually or in combination is operative to derive from said first pressure source a range of control pressure corresponding to the application pressure range of the brake arrangement.

14. An arrangement as claimed in claim 6 and including an additional pressure responsive member coupled to said group, to which fluid pressure from said source is supplied only in the "brakes released and running" condition to derive, in conjunction with the group, a control pressure for the "release and running" brake setting.

15. An arrangement as claimed in claim 6 including means responsive to the interruption of the supply of energy to the controller arranged to respectively permit or prevent the supply of fluid pressure from said first source to an additional pressure responsive member connected to said group of pressure responsive members.

16. An arrangement as claimed in claim 1 in which the feedpath includes a plurality of conductors each representing one digit of a binary signal together with a return conductor.

17. An arrangement as claimed in claim 1 in which the desired degree of braking signal is modified in transmission to the feed-path by means responsive to a signal representing a limiting value of a brake application in a specific circumstance, whereby the feedpath is then energised at the energisation selection corresponding to the modified desired degree of braking.

18. A railway vehicle brake arrangement including at a control position a controller operable to selectively electrically energize a signal feedpath from a source of electricity in accordance with a desired degree of braking, the feedpath extending from the control position to a fluid pressure brake apparatus having an electrical-to-fluid pressure converter responsive to the selected energization of the feedpath to derive from a first fluid pressure source a control pressure representative of the selected energization, a fluid pressure controller connected between a second fluid pressure source and a brake pipe of the brake apparatus and responsive to the control pressure to control the pressure maintained in the brake pipe by a second fluid pressure source to a pressure corresponding to said desired degree of braking, and a brake actuator to exert a brake effort in response to the pressure in the pipe, and including a separate pressure control means responsive to the energization of the feedpath to represent the "brakes released and running" condition of the brake control arrangement to override the converter responsive to the selected energization of the feedpath and itself control the value of the control pressure derived from the first fluid pressure source.

* * * * *